(12) United States Patent
Yang (10) Patent No.: US 10,796,668 B2
(45) Date of Patent: Oct. 6, 2020

(54) VIRTUAL OBJECT CONTROL METHOD AND RELATED DEVICE (71) Applicant: Tencent Technology (Shenzhen) Company Limited, Shenzhen (CN)

(72) Inventor: Weiqing Yang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 14 days.

(21) Appl. No.: 16/296,036

(22) Filed: Mar. 7, 2019

(65) Prior Publication Data
US 2019/0206368 A1 Jul. 4, 2019

Related U.S. Application Data (63) Continuation of application No. PCT/CN2017/112560, filed on Nov. 23, 2017.

(30) Foreign Application Priority Data

Nov. 24, 2016 (CN) .......................... 2016 1 1051066

(51) Int. Cl.
G09G 5/37 (2006.01)
G06F 3/01 (2006.01)
(52) U.S. Cl.
CPC ............... *G09G 5/37* (2013.01); *G06F 3/011* (2013.01); *G09G 2340/0464* (2013.01); *G09G 2354/00* (2013.01)
(58) Field of Classification Search
None
See application file for complete search history.

(56) References Cited

U.S. PATENT DOCUMENTS

| 7,703,045 B1* | 4/2010 | Kawahara | G06F 3/0486 715/769 |
| 2012/0052950 A1* | 3/2012 | Kataoka | A63F 13/56 463/36 |
| 2019/0262714 A1* | 8/2019 | Tokuda | A63F 13/822 |

FOREIGN PATENT DOCUMENTS

| CN | 101465957 A | 6/2009 |
| CN | 101681524 A | 3/2010 |

(Continued)

OTHER PUBLICATIONS

Tencent Technology, IPRP, PCTCN2017/112560, May 28, 2019, 6 pgs.
Tencent Technology, ISRWO, PCTCN2017/112560, Feb. 5, 2018, 7 pgs.

*Primary Examiner* — Jason A Pringle-Parker
(74) *Attorney, Agent, or Firm* — Morgan, Lewis & Bockius LLP (57) ABSTRACT

This application provides a method for controlling a virtual object performed at an electronic device: obtaining a current location of a virtual object in a virtual scene; determining whether the current location is located outside an associated area of the virtual object; in accordance with a determination that the current location of the virtual object is outside the associated area of the virtual object: determining a current state of the virtual object at the current location; in accordance with a determination that the virtual object is performing an action of a first state, controlling the virtual object to return to a pre-specified location within the associated area after the virtual object completes the action; and in accordance with a determination that the virtual object is in a second state: controlling the virtual object to return to the pre-specified location within the associated area after waiting a predetermined time period.

17 Claims, 9 Drawing Sheets

(56) References Cited

FOREIGN PATENT DOCUMENTS

| CN | 101727531 A | 6/2010 |
|---|---|---|
| CN | 106096540 A | 11/2016 |
| CN | 106503477 A | 3/2017 |

* cited by examiner

VIRTUAL OBJECT CONTROL METHOD AND RELATED DEVICE

CROSS REFERENCE TO RELATED APPLICATIONS

This application is a continuation of PCT Application PCT/CN2017/112560, entitled "VIRTUAL OBJECT CONTROL METHOD AND RELATED DEVICE" filed Nov. 23, 2017, which claims priority to Chinese Patent Application No. 201611051066.9, entitled "VIRTUAL OBJECT CONTROL METHOD AND RELATED DEVICE" filed with the Chinese Patent Office on Nov. 24, 2016, both of which are incorporated herein by reference in their entirety.

FIELD OF THE TECHNOLOGY

This application relates to the field of computer technologies, and in particular, to control of a virtual object.

BACKGROUND OF THE DISCLOSURE

Games, simulation, and other types of applications (such as a multiplayer online battle arena (MOBA) type of play-off game) can provide a user with a virtual scene in which the user can participate. The user can use a created virtual character to move in the virtual scene. In the virtual scene, in addition to the virtual character controlled by the user, there may further be virtual objects controlled by a system of the application. Such virtual objects controlled by the system are designed as being capable of interacting with the virtual character controlled by the user. For example, a non-player character chases, proactively or under attack from a player, a virtual character controlled by the player.

Such virtual objects controlled by the system are usually triggered by an activity of the virtual character of the user to move, and move according to a movement policy preset in the system of the application. As the virtual objects are important objects interacting with the virtual character of the user in the virtual scene, it is particularly necessary to optimize motion control of the virtual objects.

SUMMARY

An objective of this application is to provide a control method for a virtual object and a related apparatus, to resolve the foregoing problem.

To achieve the foregoing objective, according to a first aspect, an embodiment of this application provides a control method for controlling a virtual object, including: at an electronic device having one or more processors, memory, and a display: obtaining a current location of a virtual object in a virtual scene on the display; determining whether the current location of the virtual object is located outside an associated area of the virtual object, wherein the virtual object is configured to return to a pre-specified location within the associated area when the virtual object is outside the associated area; in accordance with a determination that the current location of the virtual object is located outside the associated area of the virtual object: determining a current state of the virtual object at the current location; in accordance with a determination that the virtual object is performing an action of a first state (e.g., the action of the first state includes the virtual object attacking another virtual object in the virtual scene, the virtual object being attacked by another virtual object in the virtual scene, the virtual object such as a monster or other animated character is dying, the virtual object being hit by another virtual character to fly toward a certain direction), waiting for the virtual object to complete the action of the first state; and after the virtual object completes the action, controlling the virtual object to return to the pre-specified location within the associated area in the virtual scene; in accordance with a determination that the virtual object is in a second state: (e.g., the virtual object is performing a specified action (repeating a simple action such as roaring or breathing at the same location, in an idle state, or a standby state), waiting a predetermined time period; and after the predetermine time period, controlling the virtual object to return to the pre-specified location within the associated area.

In some embodiments, before the obtaining a current location of a virtual object in a virtual scene, the method further includes: activating the virtual object in the virtual scene; obtaining associated area feature data of the virtual object after the virtual object is activated; and determining, according to the associated area feature data, the associated area associated with the virtual object in the virtual scene.

In some embodiments, the virtual object performs the action of the first state in response to a user instruction of another virtual object to interact with the virtual object in the virtual scene. For example, the user may control another virtual character to attack, poke, kick, hit, or in any other suitable manner to interact with the virtual object in the virtual scene. In response, the virtual object attacks, hits, and/or kicks the virtual character in the virtual scene. In some embodiments, the method further includes: forgoing any change to the state of the first virtual object while the virtual object is returning to the pre-specified location; and in accordance with detecting that the first virtual object has returned to the pre-specified location, resetting one or more parameters associated with the virtual object to original values respectively. In some embodiments, during the process of returning the virtual object from a location outside the associated area to the pre-specified location within the associated area, even the electronic device receives a user instruction to interact with the virtual object, the electronic device forgoes any change to the virtual object. That is, the virtual object does not perform any action or change any status during this returning process. In some embodiments, after the virtual object returns to the pre-specified location, one or more parameters, such as energy level, life bar, virtual money/currencies of the virtual object, game weapon or game tool associated with the virtual object are reset to the original state. That is, anything obtained by the virtual object after leaving the pre-specified location in the last cycle is removed from the virtual object.

In some embodiments, the associated area includes a closed area of the virtual object on a map.

In some embodiments, the closed area includes a customized area or a default area, where the customized area is a polygon area, a circular area, or a fan-shaped area.

In some embodiments, the associated area feature data includes location information of each vertex of the polygon area when the closed area is the polygon area; or the associated area feature data includes circle center location information, radius information, angle information, and angle anchor location information of the circular area or the fan-shaped area when the closed area is the circular area or the fan-shaped area, the circle center location information and the angle anchor location information determining an orientation of the fan-shaped area, and the circle center location information not overlapping the specified location; or the associated area feature data includes radius information of the default area when the closed area is the default area, a circle center location of the default area being the specified location.

In some embodiments, the location information of each vertex of the polygon area is stored as an attribute value of a polygon area configuration attribute of the virtual object. The circle center location information, the radius information, the angle information, and the angle anchor location information of the circular area or the fan-shaped area are stored as an attribute value of a circular area or fan-shaped area configuration attribute of the virtual object. The radius information of the default area is stored as an attribute value of a default area configuration attribute of the virtual object.

In some embodiments, the obtaining associated area feature data of the virtual object includes: determining whether the virtual object has the polygon area configuration attribute; and obtaining the attribute value of the polygon area configuration attribute if it is determined that the virtual object has the polygon area configuration attribute, and using the attribute value of the polygon area configuration attribute as the associated area feature data of the virtual object.

In some embodiments, the obtaining associated area feature data of the virtual object further includes: determining, if it is determined that the virtual object does not have the polygon area configuration attribute, whether the virtual object has the circular area or fan-shaped area configuration attribute; and obtaining the attribute value of the circular area or fan-shaped area configuration attribute if it is determined that the virtual object has the circular area or fan-shaped area configuration attribute, and using the attribute value of the circular area or fan-shaped area configuration attribute as the associated area feature data of the virtual object.

In some embodiments, the obtaining associated area feature data of the virtual object further includes: reading the attribute value of the default area configuration attribute of the virtual object if it is determined that the virtual object does not have the circular area or fan-shaped area configuration attribute, and using the attribute value of the default area configuration attribute as the associated area feature data of the virtual object.

According to a second aspect, an embodiment of this application provides an electronic device for controlling a virtual object, the electronic device having one or more processors and memory storing a plurality of programs, wherein the plurality of programs, when executed by the one or more processors, cause the electronic device to perform the aforementioned method.

For beneficial effects of the possible implementations in the second aspect, refer to beneficial effects of the corresponding method in the first aspect.

According to a third aspect, an embodiment of this application provides a non-transitory computer readable storage medium storing a plurality of programs in connection with a computing device for controlling a virtual object having one or more processors, wherein the plurality of programs, when executed by the one or more processors, cause the computing device to perform the afore mentioned method.

In the solutions provided by this application, a current location of a virtual object may be obtained, and it is determined whether the current location of the virtual object is located outside an associated area. If it is determined that the virtual object is located outside the associated area, the virtual object may be controlled to return to a specified location in a virtual scene. In this way, the virtual object can return to the specified location after exceeding the associated area, thereby improving accuracy of motion control of the virtual object, and optimizing the motion control of the virtual object. In addition, because the associated area is determined according to the associated area feature data of the virtual object, a designer may configure the associated area feature data according to a specific situation (for example, a topographic condition or a camp in the virtual scene), so that the associated area of the virtual object can be adapted to the specific condition, thereby improving adaptability of the associated area.

BRIEF DESCRIPTION OF THE DRAWINGS

To describe the technical solutions in the embodiments of this application or in the existing technology more clearly, the following briefly introduces the accompanying drawings required for describing the embodiments or the existing technology. Apparently, the accompanying drawings in the following description show merely the embodiments of this application, and a person of ordinary skill in the art may still derive other drawings from these accompanying drawings without creative efforts.

To describe the technical solutions in the embodiments of this application or in the existing technology more clearly, the following briefly introduces the accompanying drawings required by the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The embodiments of this application provide a control method for a virtual object and a related apparatus, to improve accuracy of motion control of the virtual object, and optimize the motion control of the virtual object.

Related apparatuses involved in the embodiments of this application include a control apparatus for a virtual object and a terminal device.

The control apparatus for a virtual object may be applied to the terminal device in a form of software or hardware.

Figure 1A:
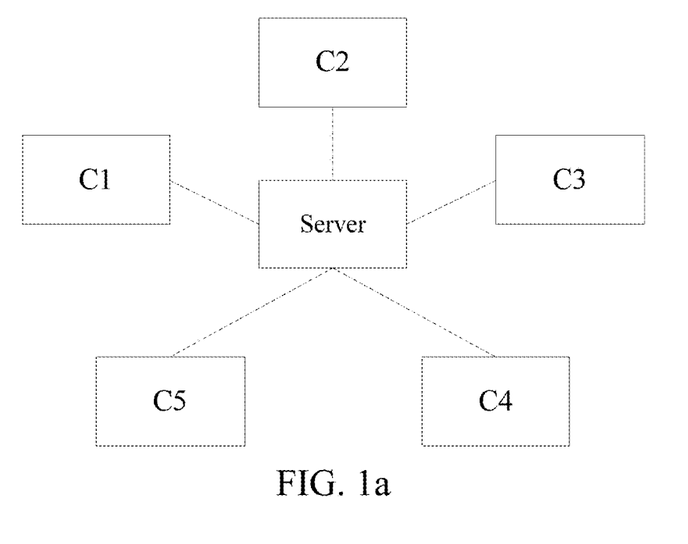
FIG. 1a and FIG. 1b are each an exemplary schematic diagram of an application scenario according to an embodiment of this application.

FIG. 1a is an exemplary application scenario of the terminal device. The application scenario includes multiple terminal devices C1 to C5 accessing a same virtual scene, and a server connected to the multiple terminal devices.

The terminal devices C1 to C5 may be various handheld devices, in-vehicle devices, wearable devices, computing devices, and positioning devices that have a communication function, or other processing devices connected to a wireless modem, and various forms of user equipments (UEs), mobile stations (MSs), mobile phones, tablet computers, desktop computers, personal digital assistants (PDAs).

A client may be deployed on each of the terminal devices C1 to C5. When games, simulation, and other types of applications can provide a user with a virtual scene in which the user can participate, the user can use a client to control a virtual object (virtual character) in the virtual scene to move in the virtual scene.

The server is responsible for providing services for various accessors (that is, the terminal devices C1 to C5). For example, after receiving a frame synchronization command sent by a client C1, the server may broadcast the frame synchronization command to clients C2 to C5. After receiving the frame synchronization command, the clients C2 to C5 may perform corresponding operations according to the frame synchronization command.

The server may be an application server, which may be a server cluster including one or more servers, or a cloud platform.

Figure 1B:
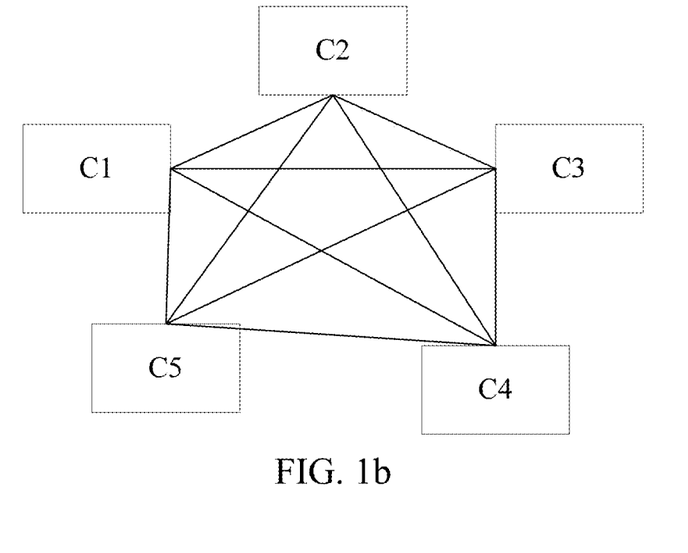

FIG. 1b is another exemplary application scenario of the terminal device. Different from the exemplary application scenario shown in FIG. 1a, the application scenario shown in FIG. 1b does not include the server. The terminal devices C1 to C5 each have the functions of the server shown in FIG. 1a.

For example, when the client C1 generates a frame synchronization command, the client C1 may broadcast the frame synchronization command to the clients C2 to C5, so that all the clients C2 to C5 can perform corresponding operations according to the frame synchronization command.

It should be noted that FIG. 1a and FIG. 1b each exemplary show five terminal devices. In an actual application scenario, the quantity of terminal devices is not limited to five. There may be fewer or more terminal devices.

Figure 2:
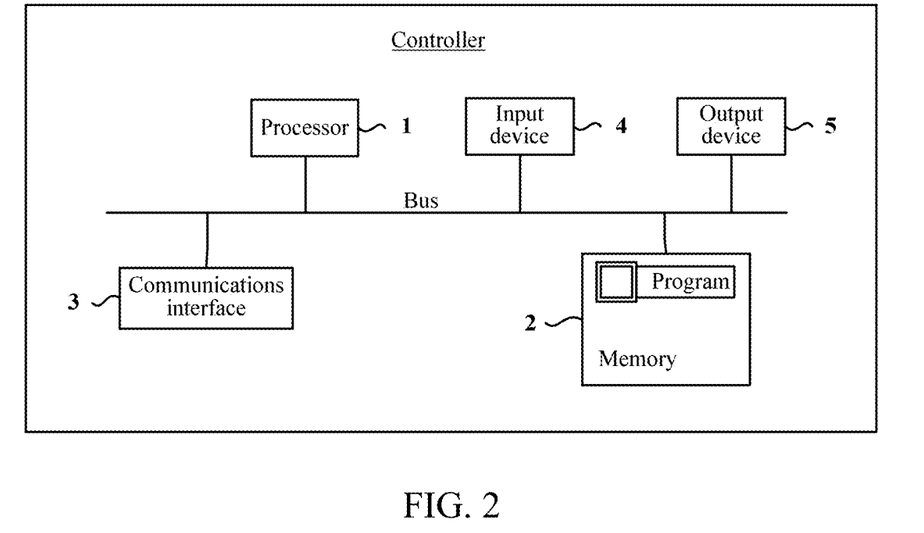
FIG. 2 and FIG. 9 are each an exemplary structural diagram of a control device for a terminal device/virtual object according to an embodiment of this application.

FIG. 2 is an exemplary structural diagram of a control apparatus for a virtual object. As shown in FIG. 2, the control apparatus may include a bus, a processor 1, a memory 2, a communications interface 3, an input device 4, and an output device 5. The processor 1, the memory 2, the communications interface 3, the input device 4, and the output device 5 are connected to one another by using the bus.

The bus may include a channel, to transfer information between components of a computer system.

The processor 1 may be a general-purpose processor, for example, a central processing unit (CPU), a network processor (NP), or a microprocessor, or may be an application-specific integrated circuit (ASIC), or one or more integrated circuits for controlling execution of programs of the solutions of this application, or may be a digital signal processor (DSP), an ASIC, a field programmable gate array (FPGA), or another programmable logical device, discrete gate or transistor logical device, or discrete hardware component.

In an example, the processor 1 may include a host processor, a baseband chip, and a modem.

The memory 2 stores a program for performing the technical solutions of this application, and may further store an operating system and other key services. Specifically, the program may include program code, and the program code includes a computer operation instruction. More specifically, the memory 2 may include a read-only memory (ROM), another type of static storage device that can store static information and an instruction, a random access memory (RAM), another type of dynamic storage device that can store information and an instruction, a magnetic disk storage, a solid-state memory, an animation editor (flash), or the like.

The input device 4 may include an apparatus for receiving data and information input by a user, for example, a keyboard, a mouse, a camera, a scanner, a light pen, a voice input device, a touchscreen, a pedometer, or a gravity sensor.

The output device 5 may include an apparatus allowed to output information to the user, for example, a display screen, or a speaker.

The communications interface 3 may include any apparatus that uses a transceiver, to communicate with another device or a communications network, for example, the Ethernet, a radio access network (RAN), or a wireless local area network (WLAN).

The processor 1 executes the program stored in the memory 2, and invokes another device, to implement the control method for a virtual object provided in this application.

The following provides further detailed descriptions based on a system architecture shown in FIG. 1a or FIG. 1b and common aspects described above and involved in this application.

For simplicity, all the embodiments of this application are described by using one virtual object as an example. It may be understood that for a virtual scene in which multiple virtual objects exist, the solutions provided in this application can be used when each virtual object needs to be controlled to return to a specified location in the virtual scene.

Figure 3:
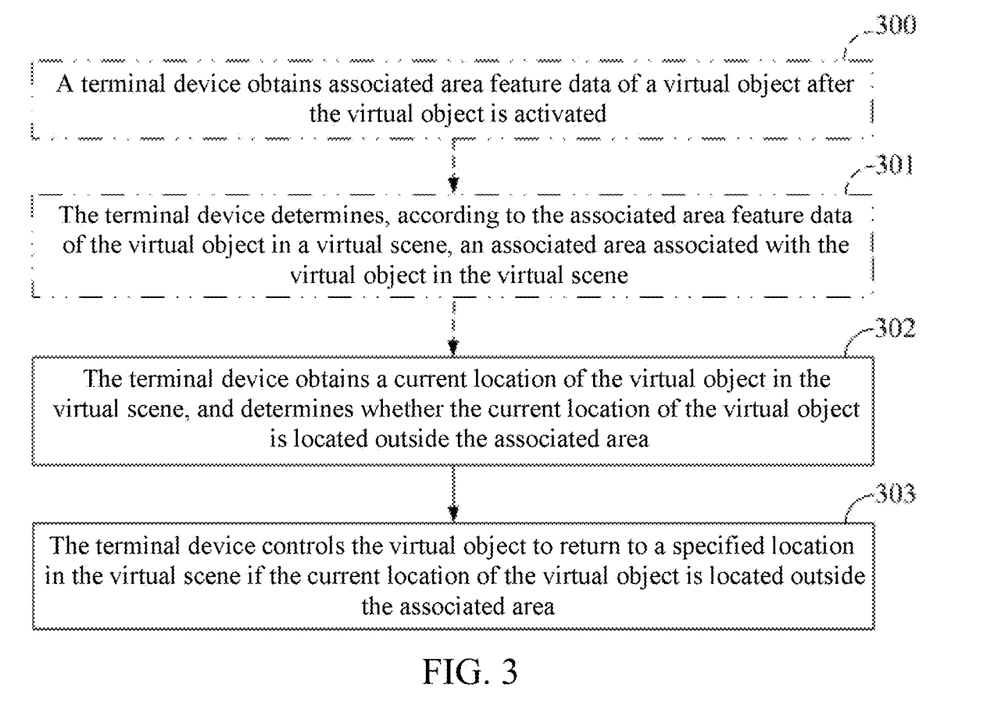
FIG. 3, FIG. 4, and FIG. 8 are each an exemplary flowchart of a control method for a virtual object according to an embodiment of this application.

FIG. 3 is an exemplary schematic flowchart of a control method for a virtual object according to an embodiment of this application. The control method for a virtual object may be implemented by a processor 1 in a terminal device executing a program stored in a memory 2 and implemented by invoking another device.

The schematic procedure includes:

In a part 302, a terminal device obtains a current location of a virtual object in a virtual scene, and determines whether the current location of the virtual object is located outside an associated area.

In this embodiment, when the current location of the virtual object needs to be obtained, the current location of the virtual object may be read frame by frame or every few frames.

Correspondingly, it may be determined, frame by frame, whether the current location of the virtual object falls outside the associated area associated with the virtual object. For example, for a monster in a game, it may be determined, frame by frame, whether a current location of the monster falls outside an "enemy seeking range" of the monster.

Certainly, it may alternatively be determined, every few frames, whether the current location of the virtual object falls outside the associated area associated with the virtual object. For example, also for a monster in a game, it may be determined, every two frames, whether a current location of the monster falls outside an "enemy seeking range" of the monster. It should be emphasized that in this embodiment of this application, the timing of determining whether the current location of the virtual object is located outside the associated area is not specifically limited herein.

In a part 303, the terminal device controls the virtual object to return to a specified location in the virtual scene if the current location of the virtual object is located outside the associated area.

The specified location in the virtual scene may be located in the associated area of the virtual object.

Specifically, in a game scene, many virtual objects have their birth points, and the birth point of the virtual object may be used as the specified location. For example, a birth point location of a monster may be used as the specified location.

It may be understood that the virtual object is not controlled to return if it is determined that the current location of the virtual object is located in the associated area of the virtual object.

It should be noted that as shown in FIG. 3, in an implementation of this embodiment of this application, before the part 302, the method may further include:

In a part 300, the terminal device obtains associated area feature data of the virtual object after the virtual object is activated.

In this embodiment, the virtual object may be a virtual thing or person that needs to be controlled. For example, in a MOBA type play-off game, the virtual object may be a non-player character, such as a virtual monster or a virtual beast.

That the virtual object is activated may be understood as follows: When a game is initialized, if the virtual object reaches a triggering condition, the virtual object may be considered to have been activated. For example, when the virtual object is attacked, it may be considered that the virtual object is activated.

The associated area feature data represents a feature of the associated area of the virtual object in the virtual scene, and the associated area feature data may be used for determining the associated area of the virtual object in the virtual scene.

It should be noted that a designer may configure the associated area feature data according to a specific situation (for example, a topographic condition in the virtual scene) in the virtual scene, so that the associated area of the virtual object can be adapted to the specific situation in the virtual scene, thereby improving adaptability of the associated area of the virtual object.

In a part 301, the terminal device determines, according to the associated area feature data of the virtual object in the virtual scene, the associated area associated with the virtual object in the virtual scene.

In some game scenes, the associated area may be specifically an enemy seeking range. For example, the enemy seeking range may be a limit used in a game for defining a range in which a monster chases an enemy.

It should be noted that the associated area may be a two-dimensional closed area or a three-dimensional closed area in the virtual scene.

In a subsequent part of this embodiment of this application, description is provided by using an example in which the associated area is a two-dimensional closed area. Unless otherwise specially stated, either the closed area or the associated area mentioned in the subsequent part of this embodiment of this application refers to the two-dimensional closed area.

The closed area may be adjusted to different shapes according to a specific situation in the virtual scene. For example, the closed area may be adjusted to a quadrilateral, a triangular, a circular, an elliptical, or even an irregular shape according to different topographic conditions in the virtual scene. A method of how to adjust the closed area according to the specific situation in the virtual scene is to be further described in detail in subsequent descriptions.

It should be emphasized that in a game scene, the part 300 and the part 301 may belong to an initialization part of a game.

It can be learned that in the solution provided in this embodiment of this application, a current location of a virtual object may be obtained, and it is determined whether the current location of the virtual object is located outside an associated area. If it is determined that the virtual object is located outside the associated area, the virtual object may be controlled to return to a specified location in a virtual scene. In this way, the virtual object can return to the specified location after exceeding the associated area, thereby improving accuracy of motion control of the virtual object, and optimizing the motion control of the virtual object. In addition, because the associated area is determined according to the associated area feature data of the virtual object, a designer may configure the associated area feature data according to a specific situation (for example, a topographic condition or a camp in the virtual scene), so that the associated area of the virtual object can be adapted to the specific condition, thereby improving adaptability of the associated area.

Moreover, it should be further noted that this embodiment of this application is also applicable to action control of a moving object in a non-virtual scene. For example, this embodiment of this application is applicable to an anti-reconnaissance scene of an unmanned aerial vehicle: if a suspicious flying object enters a patrol area of the unmanned aerial vehicle, the unmanned aerial vehicle can drive the suspicious flying object away, and when the unmanned aerial vehicle flies out of its patrol area, the unmanned aerial vehicle may be controlled to return.

Figure 4:
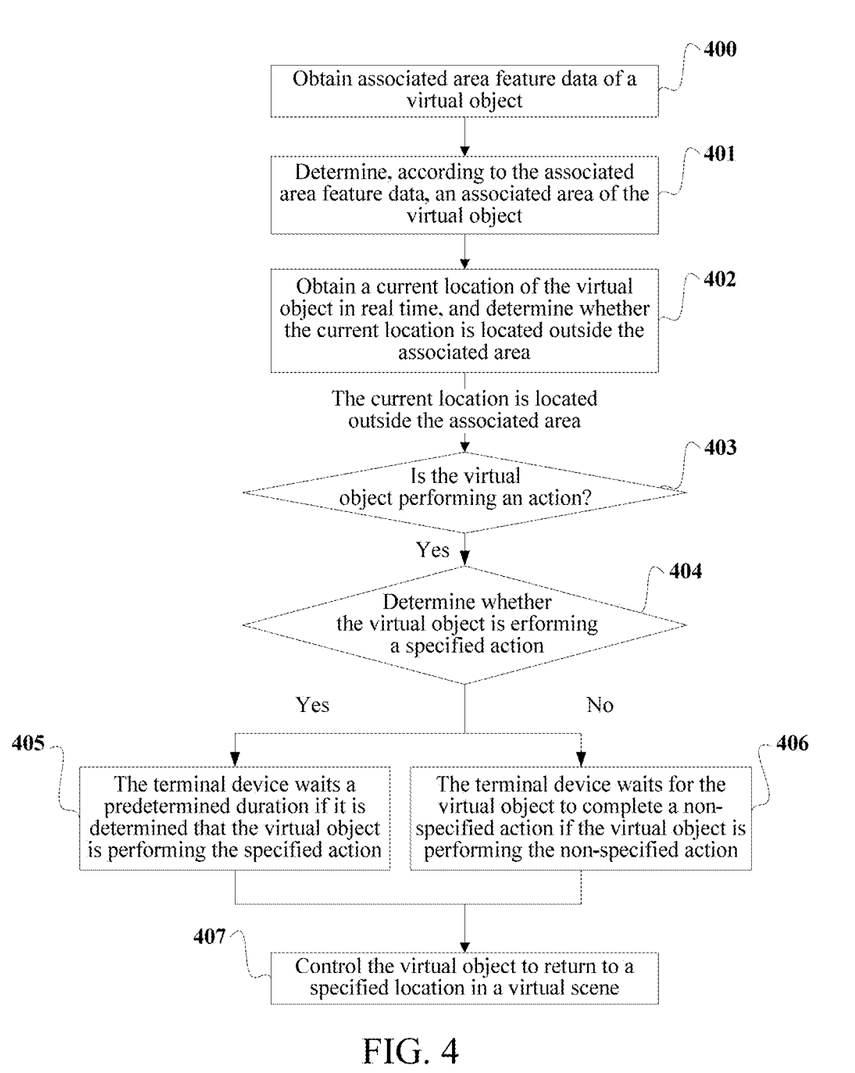

FIG. 4 is another exemplary schematic flowchart of a control method for a virtual object according to an embodiment of this application. The control method for a virtual object may be implemented by a processor 1 in a terminal device executing a program stored in a memory 2 and implemented by invoking another device.

The schematic procedure includes:

A part 400 to a part 402 are the same as the part 300 to the part 302. Therefore, for the part 400 to the part 402, refer to related descriptions of the part 300 to the part 302. Details are not described herein again.

In a part 403, the terminal device determines whether the virtual object is performing an action, and if yes, enters a part 404.

In a part 404, it is determined whether the virtual object is performing a specified action, and if yes, a part 405 is entered; otherwise, a part 406 is entered.

In a part 405, the terminal device waits a predetermined duration if it is determined that the virtual object is performing the specified action.

The specified action may be a standby action. For example, in a game scene, a standby action of a non-player character may be specifically an idle action. If the non-player character is a monster, the idle action may be a breathing action.

In an example, the predetermined duration may be 0.5 second to 1 second. Certainly, a person skilled in the art may design the predetermined duration longer or shorter according to an actual situation.

It may be understood that an objective of waiting a preset duration is to wait for completion of the specified action to prevent an action conflict from occurring.

In a part 406, the terminal device waits for the virtual object to complete a non-specified action if the virtual object is performing the non-specified action.

Specifically, in a game scene, a non-player character plays different non-specified actions (animations) in different cases, for example, attack, death, or being hit. In addition, one action may be played by using one or more frames.

For example, it is assumed that an attack action of a monster needs to be played in the 1000th to the 1004th frame. However, in the 1002nd frame, it is determined that the monster is located outside its associated area. In this case, if the monster is directly controlled to return to a specified location, the attack action of the monster is not completed, causing an action conflict. In terms of animation performance, a case such as running back and forth/jittering/being stuck occurs in the monster.

To prevent the foregoing action conflict from occurring, the virtual object may be controlled to return to a specified location after the virtual object completes an action other than the specified action.

In a part 407, the terminal device controls the virtual object to return to a specified location in the virtual scene.

The specified location in the virtual scene may be located in the associated area of the virtual object.

Specifically, in a game scene, many virtual objects have their birth points, and the birth point of the virtual object may be used as the specified location. For example, a birth point location of a monster may be used as the specified location.

It may be understood that the virtual object is not controlled to return if the current location of the virtual object is located in the associated area of the virtual object.

In an example, an action of running back to the specified location by the virtual object may be played to control the virtual object to return to the specified location.

It should be noted that in a process in which the virtual object returns to the specified location, the virtual object does not respond to any other event, and an AI behavior of the virtual object is reset after the virtual object returns to the specified location. The AI behavior may be an overview of behaviors of the virtual object in the game.

For example, assuming that the virtual object is a monster and the specified location is a birth point of the monster, in a process in which the monster returns to the birth point, even if the monster is attacked by another virtual object, the monster does not respond to any attack, and after the monster returns to the birth point, the AI behavior of the monster is reset.

It can be learned that in this embodiment, if a virtual object is located outside an associated area, the virtual object does not immediately return to a specified location, but waits for the virtual object to complete an action other than an ongoing specified action or waits a predetermined duration. In this way, a case such as running back and forth/jittering/being stuck can be prevented from occurring in a process in which the virtual object returns to the specified location.

Moreover, it should be noted that this embodiment of this application is also applicable to action control of a moving object in a non-virtual scene. For example, this embodiment of this application is applicable to an anti-reconnaissance scene of an unmanned aerial vehicle: if the unmanned aerial vehicle flies out of its patrol area, the unmanned aerial vehicle may be controlled to return after the unmanned aerial vehicle completes an ongoing action or after a predetermined duration is waited.

The following is to describe the closed area and the associated area feature data.

In this embodiment, the closed area may be classified as a customized area or a default area. The customized area may be classified as a polygon area, a circular area, or a fan-shaped area. The following is to specifically describe the multiple types of closed areas.

First, the default area may be a circular area by using a specified location as a circle center, that is, a circle center of the default area is the specified location. In some game scenes, the specified location may be a birth point of a virtual object.

Because the circle center of the default area overlaps the specified location, associated area feature data corresponding to the default area may include only radius information of the default area.

In addition, because a circle center of the circular area or the fan-shaped area does not overlap the specified location, associated area feature data corresponding to the circular area or the fan-shaped area may include circle center location information, radius information, angle information, and angle anchor location information of the fan-shaped/circular area.

Figure 5A:
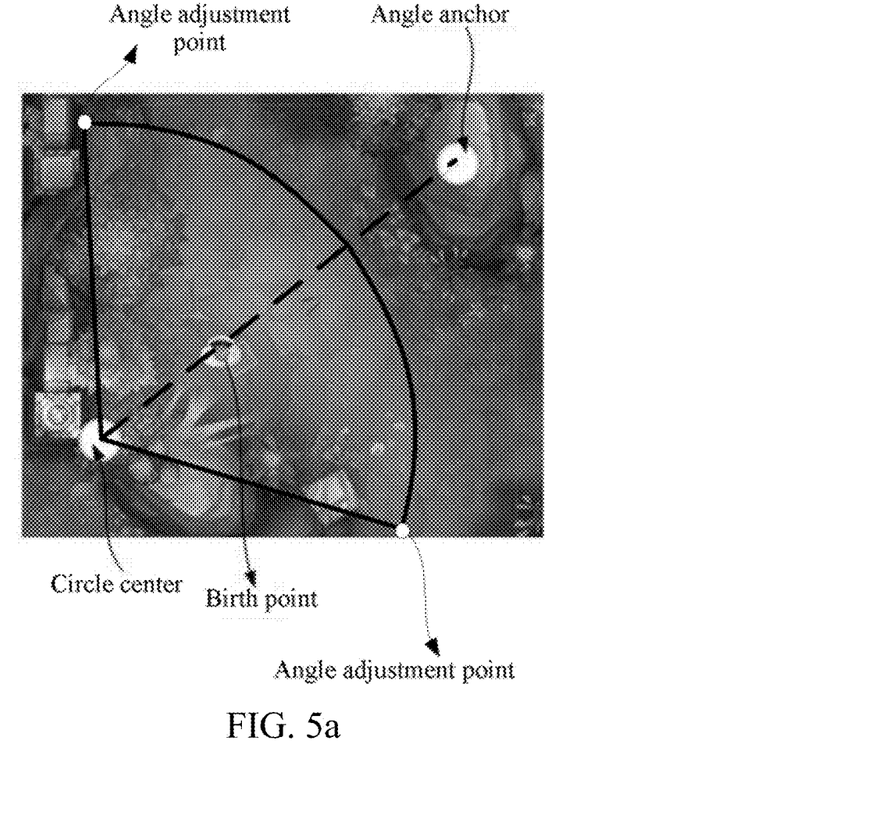
FIG. 5a and FIG. 5b are each a schematic diagram of a fan-shaped area according to an embodiment of this application.
Figure 5B:
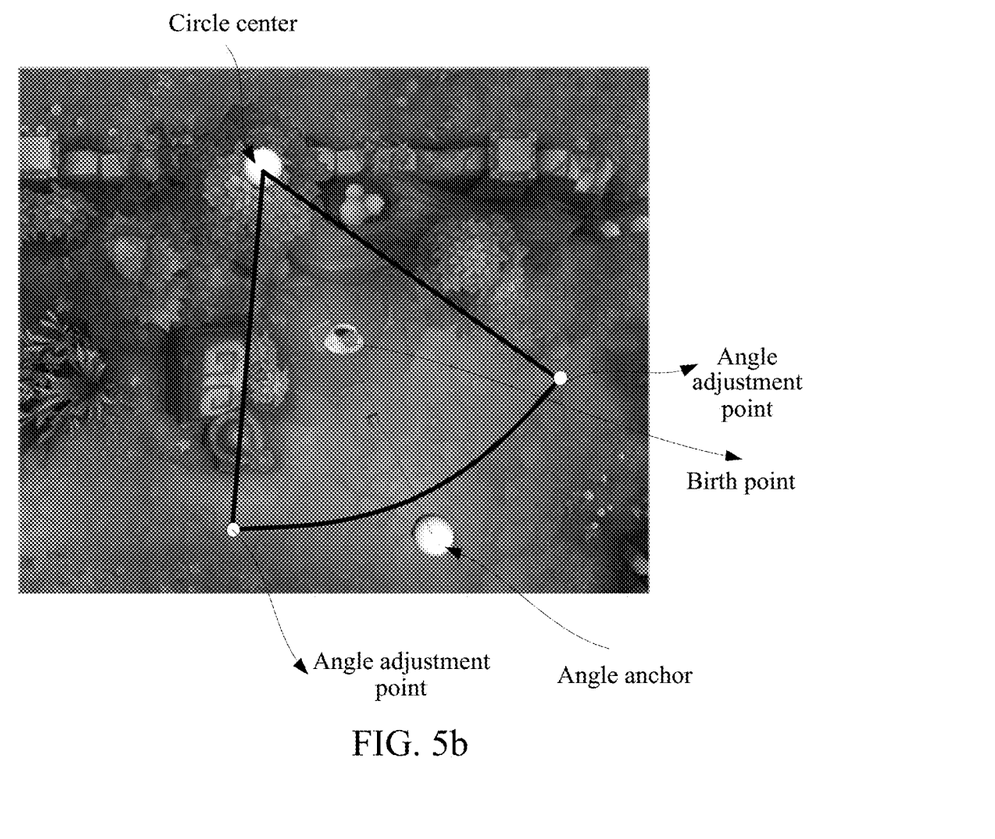

The circle center location information and the angle anchor location information may determine an orientation of the fan-shaped area. For example, referring to FIG. 5a and FIG. 5b, FIG. 5a and FIG. 5b shows two fan-shaped areas having different orientations and angles. If an angle of a fan-shaped area is set to 360 degrees, a circular area may be generated.

Further, due to impact of topographic conditions in the virtual scene, the closed area of the virtual object may be a quadrilateral, a triangular, a circular, an elliptical, or even an irregular shape. That is, the closed area may be a polygon area, and the associated area feature data corresponding to the closed area may include location information of each vertex of the customized area.

Figure 5C:
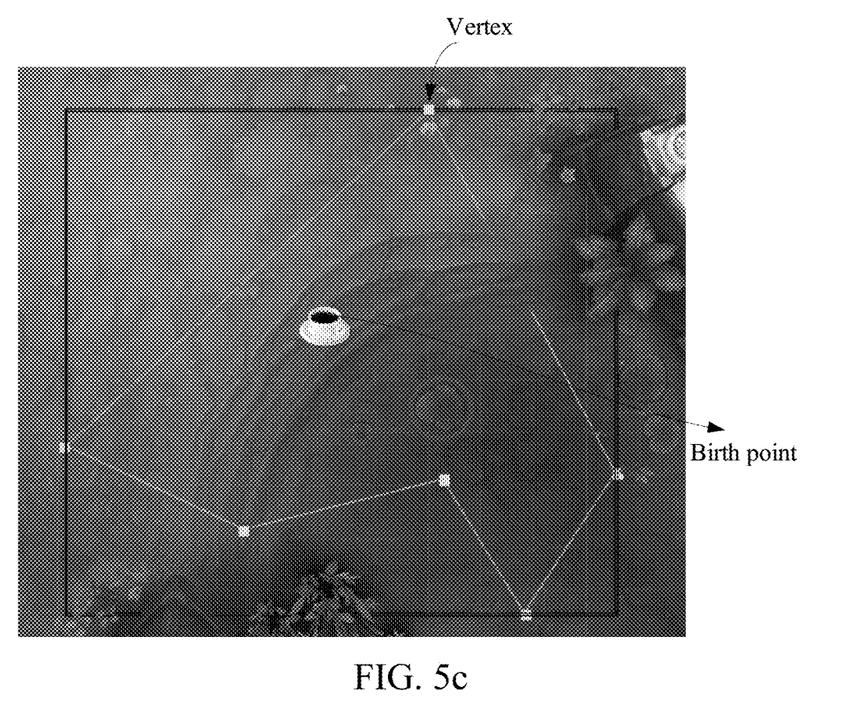
FIG. 5c is a schematic diagram of a customized area according to an embodiment of this application.

For example, referring to FIG. 5c, because there is a grass at an intersection, and a monster cannot enter the grass, a closed area (an enemy seeking range) of the monster may be a customized area. For example, the closed area of the monster may be an irregular hexagon.

In a design process, an editor may be used to design the associated area feature data.

In an example, the editor may be mounted on a terminal device or a server, to provide a visual edit screen for a designer.

For convenience of design, a map on which the virtual object is located may be imported into the edit screen.

Each virtual object has its own identity (ID), and the designer may enter a monster ID, or the editor provides the ID of each virtual object on the map for the designer. The designer selects an ID by using an input device (which is usually a mouse or a keyboard), and then associated area feature data of a monster corresponding to the ID may be configured.

The edit screen may further provide area configuration attribute options for the designer to select from.

The area configuration attribute options may include a polygon area configuration attribute, a circular area or fan-shaped area configuration attribute, and a default area configuration attribute. The designer may select one option from the multiple area configuration attribute options by placing a tick or in another manner. The associated area feature data is an attribute value of an area configuration attribute.

Specifically, the foregoing three options may be listed on the edit screen, and there may be a checkbox before each option. Assuming that the designer enters a selection instruction by using the input device (the designer clicks at a location of the checkbox by using a mouse or a keyboard, and then the selection instruction is entered), an option may be selected.

After a configuration attribute is selected, a configuration list associated with the attribute is expanded for the designer to enter data.

Figure 6:
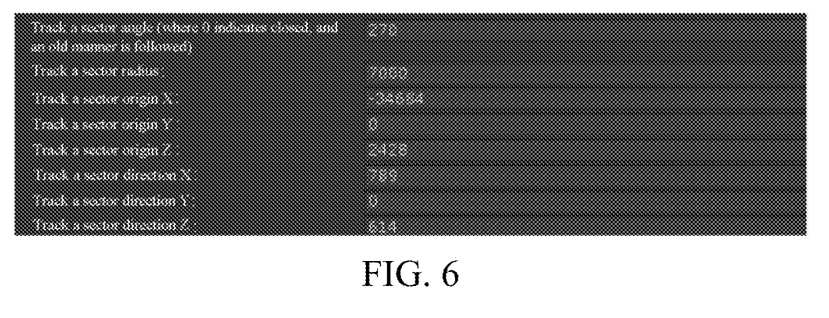
FIG. 6 is a schematic diagram of a configuration list according to an embodiment of this application.

For example, referring to FIG. 6, when the designer selects the fan-shaped area configuration attribute, a configuration list associated with the fan-shaped area configuration attribute is expanded. The editor listens to an input of the input device, and fills in a configuration list according to the input of the input device, or the designer may manually adjust in a form of a view.

For example, using FIG. 5a as an example, when the designer selects the fan-shaped area configuration attribute, a sector is displayed on the map. Circle center information, radius information, angle information, and angle anchor information of the sector are all default information.

The designer may move a circle center and an angle anchor by using the input device, to change locations of the circle center and the angle anchor.

Moreover, referring to FIG. 5a or FIG. 5b, the designer may move an angle adjustment point by using the input device, to change a radius length and an angle.

Figure 7:
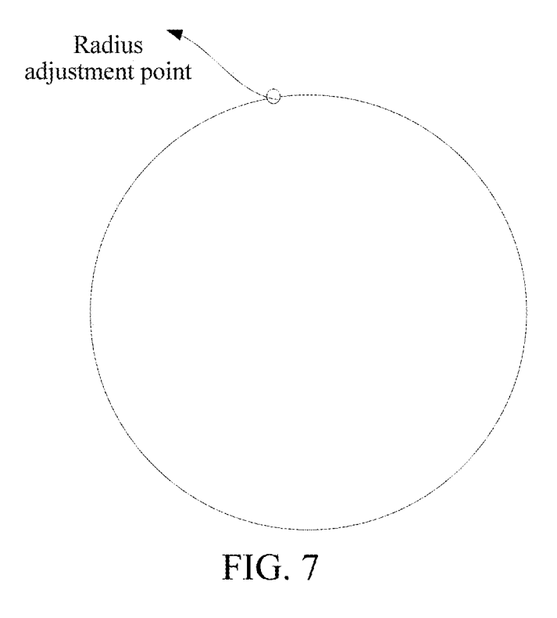
FIG. 7 is a schematic diagram of setting a radius of a default area according to an embodiment of this application.

For a basic area configuration attribute, the designer may directly enter a radius value by using the input device. Alternatively, referring to FIG. 7, a radius adjustment point may be set on a circumference of the default area, so that the designer can move the radius adjustment point by using the input device, to change the radius length.

For another example, when the designer selects the polygon area configuration attribute, at least three vertexes may be displayed on the map imported by the editor. The edit screen may provide icons of the vertexes. If a new vertex needs to be added, an icon of the vertex may be dragged into an editing area. In this way, the vertex can be added.

The editor automatically generates a closed area according to vertexes in the editing area. The designer may move the vertexes by using the input device, to change a shape of the polygon area.

After the design is completed, the designer clicks save, and the location information of each vertex of the polygon area is stored as an attribute value of the polygon area configuration attribute of the virtual object. The circle center location information, the radius information, the angle information, and the angle anchor location information of the circular area or the fan-shaped area are stored as an attribute value of the circular area or fan-shaped area configuration attribute of the virtual object. The radius information of the default area is stored as an attribute value of the default area configuration attribute of the virtual object.

It should be noted that if none of the attribute values of the foregoing attributes are configured, an error is to be reported when the map is saved or exported.

The exporting the map refers to converting the map and related data in the editor into a file that can be used by a client.

It should be noted that various related data of the virtual object may be stored in a map editor and a basic table.

In a game, the map editor may read and use a game resource and output map data in a corresponding format. A client/server may construct a game scene by using the map data, and present the game scene to a user.

Main functions of the map editor may include two parts: map making and map resource management. Map making may mainly include earth surface generation, map virtual object placing, map attribute setting, and map data output.

Map resource management may include map virtual object editing, map virtual object attribute setting, and resource data output. A map virtual object may refer to a picture and animation resource placed on the game map and used for indicating the earth surface, a tree, a house, a non-player character, or the like.

In an example, the circular area or fan-shaped area configuration attribute and the polygon area configuration attribute may be used as a map attribute. The attribute value corresponding to the circular area or fan-shaped area configuration attribute or the polygon area configuration attribute may be configured (stored) in the map editor.

It should be noted that circular area or fan-shaped area configuration attributes and attribute values, or polygon area configuration attributes and attribute values of multiple virtual objects may be configured in a same map.

The default area configuration attribute and its attribute value may be configured in the basic table of the virtual object.

The following describes the technical solutions of this application by using a more detailed embodiment.

Figure 8:
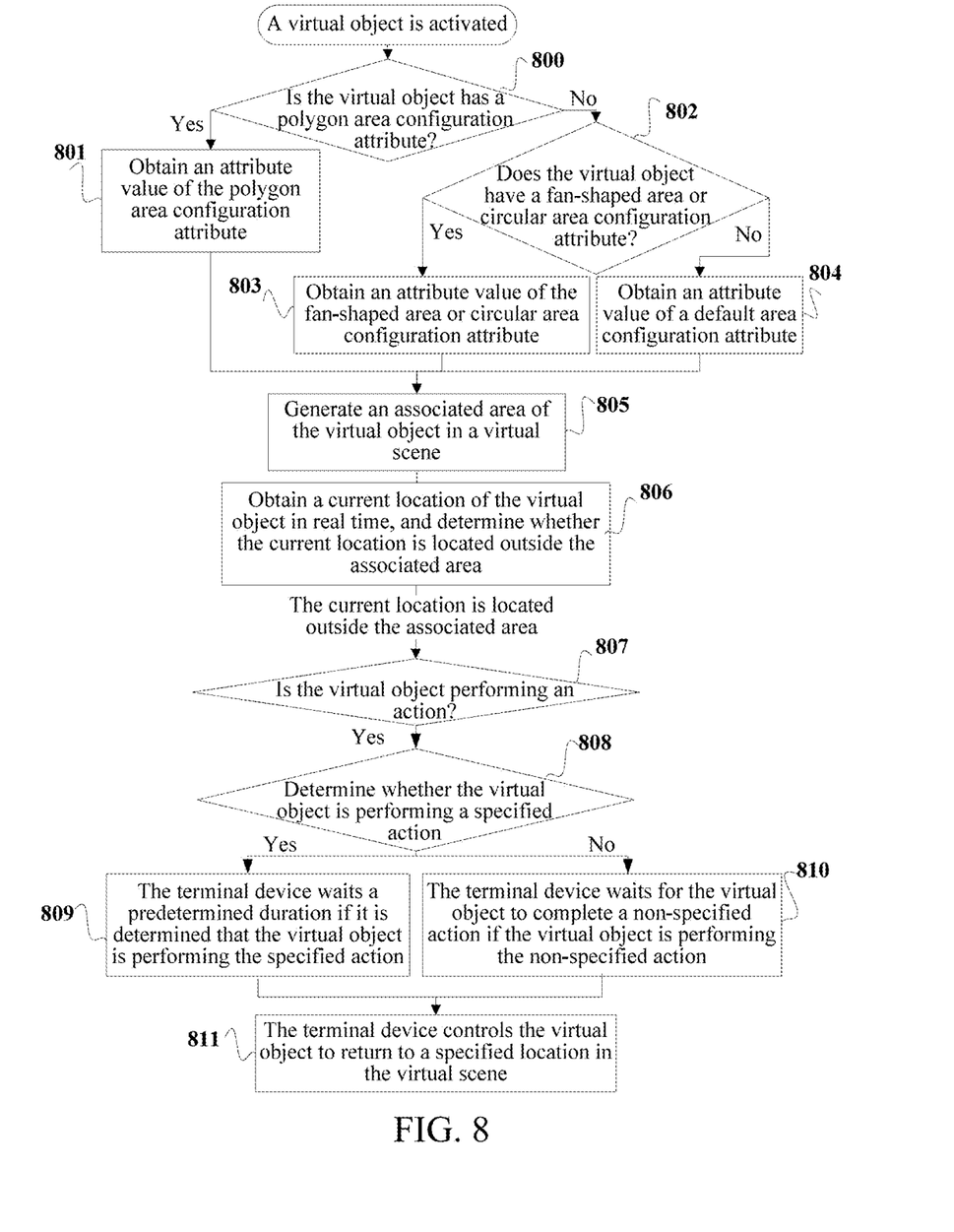

FIG. 8 is an exemplary schematic flowchart of a control method for a virtual object according to an embodiment of this application. The control method for a virtual object may be implemented by a processor 1 in a terminal device executing a program stored in a memory 2 and implemented by invoking another device.

The schematic procedure includes:

In a part 800, a client determines, after a virtual object is activated, whether the virtual object has a polygon area configuration attribute, and if yes, a part 801 is entered; otherwise, a part 802 is entered.

More specifically, a monster is activated when a game is initialized or the monster is attacked.

In an example, an ID of the virtual object may be used to search for the polygon area configuration attribute of the virtual object in a map editor, and if the polygon area configuration attribute is found, the virtual object has the polygon area configuration attribute; otherwise, the virtual object does not have the polygon area configuration attribute.

In a part 801, the client obtains an attribute value of the polygon area configuration attribute.

If the virtual object has the polygon area configuration attribute, the attribute value of the polygon area configuration attribute is the foregoing associated area feature data. Alternatively, in another embodiment of this application, the attribute value of the polygon area configuration attribute may be read according to an ID of the virtual object, and if a read result is empty, it indicates that the virtual object does not have the polygon area configuration attribute.

In a part 802, the client determines whether the virtual object has a circular area or fan-shaped area configuration attribute, and if yes, a part 803 is entered; otherwise, a part 804 is entered.

The part 802 is similar to the part 800 and is not described in detail herein.

In a part 803, the client obtains an attribute value of the circular area or fan-shaped area configuration attribute.

The part 803 is similar to the part 801 and is not described in detail herein.

In a part 804, the client obtains an attribute value of a default area configuration attribute of the virtual object.

More specifically, radius information in a basic table of the virtual object may be read.

In a part 805, the client generates an associated area of the virtual object in the foregoing virtual scene.

It should be noted that if radius information of a default area is obtained, a birth point of the virtual object is used as a circle center to generate a circular default area. If circle center location information, radius information, angle information, and angle anchor location information are obtained, a corresponding circular area or fan-shaped area is generated. If vertex location information is obtained, a polygon area is generated according to the vertex location information.

The parts 806 to 811 are the same as the part 402 to 407 in the foregoing embodiment and are not described in detail herein.

The solutions provided by the embodiment of this application are mainly described from the perspective of interaction between the devices. It may be understood that to implement the foregoing functions, the devices, such as a terminal device or a base station includes corresponding hardware structures and/or software modules for implementing the functions. A person skilled in the art should be easily aware that this application can be implemented by hardware or in a form of a combination of hardware and computer software with reference to units and algorithm steps of examples described in the embodiments disclosed in this specification. Whether a function is performed by hardware or by computer software driving hardware depends on a particular application and design restraint condition of the technical solutions. A person skilled in the art may use different methods to implement the described functions for each particular application, but it should not be considered that the implementation falls outside the scope of this application.

Figure 9:
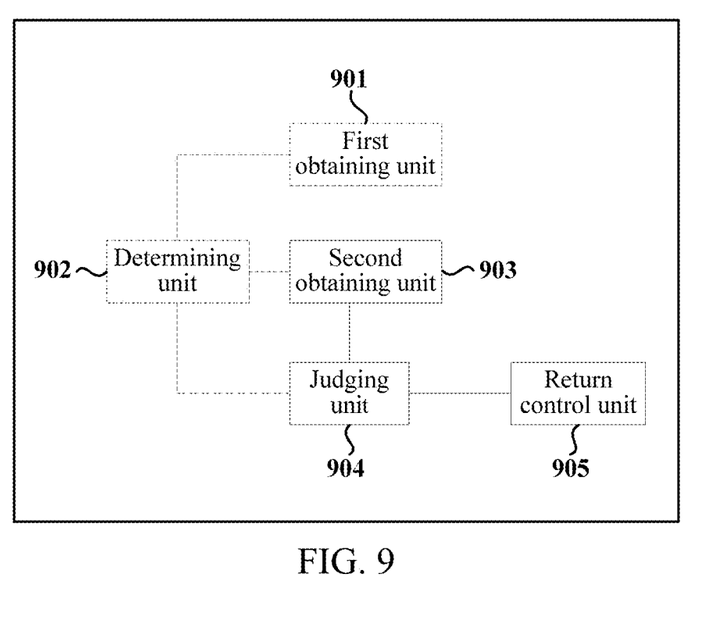

FIG. 9 is a possible schematic structural diagram of a terminal device or a control device involved in the foregoing embodiments, including:

a first obtaining unit 903, configured to obtain in real time a current location of a virtual object in a virtual scene;

a judging unit 904, configured to determine whether the current location of the virtual object is located outside an associated area; and a return control unit 905, configured to control, in response to the judging unit 904 determining that the current location is located outside the associated area, the virtual object to return to a specified location.

In an implementation of this embodiment of this application, as shown in FIG. 9, the apparatus may further include:

a second obtaining unit 901, configured to obtain associated area feature data of the virtual object; and a determining unit 902, configured to determine, according to the associated area feature data, the associated area associated with the virtual object in the virtual scene.

The specified location is located in the associated area.

For related descriptions, refer to the method part of this specification. Details are not described herein again.

In another embodiment of this application, the return control unit 905 may be further configured to:

determine, before controlling the virtual object to return to the specified location, whether the virtual object is performing an action; and wait for the virtual object to complete the action if determining that the virtual object is performing the action.

The return control unit 905 may be further configured to:

determine whether the virtual object is performing a specified action; and wait a predetermined duration if determining that the virtual object is performing the specified action.

The operation of controlling the virtual object to return to the specified location in the virtual scene is performed after the return control unit 905 waits for the virtual object to complete an action other than the specified action or waits the predetermined duration.

For related descriptions, refer to the method part of this specification. Details are not described herein again.

The first obtaining unit 901 may be configured to perform the part 300 of the embodiment shown in FIG. 3, and may further perform the part 400 of the embodiment shown in FIG. 4 and the parts 800 to 804 in the embodiment shown in FIG. 8.

The determining unit 902 may be configured to perform the part 301 of the embodiment shown in FIG. 3, and may further perform the part 401 of the embodiment shown in FIG. 4 and the part 805 in the embodiment shown in FIG. 8.

The second obtaining unit 903 may be configured to perform the operation of "obtaining a current location of a virtual object in real time" in the part 302 of the embodiment shown in FIG. 3, the operation of "obtaining a current location of a virtual object in real time" in the part 402 of the embodiment shown in FIG. 4, and the operation of "obtaining a current location of a virtual object in real time" in the part 806 of the embodiment shown in FIG. 8.

The judging unit 904 may be configured to perform the related determining operation in the part 302 of the embodiment shown in FIG. 3, the related determining operation in the part 402 of the embodiment shown in FIG. 4, and the related determining operation in the part 806 of the embodiment shown in FIG. 8.

The return control unit 905 may be configured to perform the part 303 of the embodiment shown in FIG. 3, the parts 403 to 406 of the embodiment shown in FIG. 4, and the parts 807 to 810 in the embodiment shown in FIG. 8.

An embodiment of this application further provides a storage medium, used for storing program code. The program code is used for performing any implementation of the control method for a virtual object in the foregoing embodiments.

An embodiment of this application further provides includes a computer program product including an instruction. When the computer program product runs on a computer, the computer performs any implementation of the control method for a virtual object in the foregoing embodiments.

A person skilled in the art should be aware that in the one or more examples described above, the functions described in this application can be implemented by using hardware, software, firmware, or any combination thereof. When implemented by using software, the functions may be stored in a computer readable medium or transmitted as one or more instructions or code on a computer readable medium. The computer readable medium includes a computer storage medium and a communications medium. The communications medium includes any medium that enables a computer program to be transmitted from one place to another. The storage medium may be any available medium accessible to a general-purpose or special purpose computer.

In the foregoing specific implementations, the objective, technical solutions, and beneficial effects of this application are further described in detail. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A control method for controlling a virtual object, comprising:
   at an electronic device having one or more processors, memory, and a display:
   activating the virtual object in a virtual scene;
   obtaining a current location and area feature data of the virtual object in the virtual scene on the display;
   determining an associated area of the virtual object according to the area feature data;
   determining whether the current location of the virtual object is located outside the associated area of the virtual object, wherein the virtual object is configured to return to a pre-specified location within the associated area when the virtual object is outside the associated area;
   in accordance with a determination that the current location of the virtual object is outside the associated area of the virtual object, determining a current state of the virtual object at the current location;
   in accordance with a determination that the virtual object is performing an action of a first state:
   controlling the virtual object to return to the pre-specified location within the associated area in the virtual scene after waiting for the virtual object to complete the action of the first state; and
   in accordance with a determination that the virtual object is in a second state:
   controlling the virtual object to return to the pre-specified location within the associated area after waiting for a predetermine time period.

2. The control method according to claim 1, wherein the virtual object performs the action of the first state in response to a user instruction of another virtual object to interact with the virtual object in the virtual scene.

3. The control method according to claim 1, further comprising:
   forgoing any change to the state of the virtual object while the virtual object is returning to the pre-specified location; and
   in accordance with detecting that the virtual object has returned to the pre-specified location, resetting one or more parameters associated with the virtual object to original values respectively.

4. The control method according to claim 1, wherein the associated area comprises a closed area of the virtual object on a map.

5. The control method according to claim 4, wherein the closed area comprises a customized area or a default area, wherein the customized area is a polygon area, a circular area, or a fan-shaped area.

6. The control method according to claim 5, wherein
   the associated area feature data comprises location information of each vertex of the polygon area when the closed area is the polygon area; or
   the associated area feature data comprises circle center location information, radius information, angle information, and angle anchor location information of the circular area or the fan-shaped area when the closed area is the circular area or the fan-shaped area, the circle center location information and the angle anchor location information determining an orientation of the fan-shaped area, and the circle center location information not overlapping the specified location; or
   the associated area feature data comprises radius information of the default area when the closed area is the default area, a circle center location of the default area being the specified location.

7. The control method according to claim 6, wherein
   the location information of each vertex of the polygon area is stored as an attribute value of a polygon area configuration attribute of the virtual object;
   the circle center location information, the radius information, the angle information, and the angle anchor location information of the circular area or the fan-shaped area are stored as an attribute value of a circular area or fan-shaped area configuration attribute of the virtual object; and
   the radius information of the default area is stored as an attribute value of a default area configuration attribute of the virtual object.

8. The control method according to claim 7, wherein the operation of obtaining associated area feature data of the virtual object comprises:
   determining whether the virtual object has the polygon area configuration attribute; and
   obtaining the attribute value of the polygon area configuration attribute if it is determined that the virtual object has the polygon area configuration attribute, and using the attribute value of the polygon area configuration attribute as the associated area feature data of the virtual object.

9. The control method according to claim 8, wherein the operation of obtaining associated area feature data of the virtual object further comprises:
   determining, if it is determined that the virtual object does not have the polygon area configuration attribute, whether the virtual object has the circular area or fan-shaped area configuration attribute; and
   obtaining the attribute value of the circular area or fan-shaped area configuration attribute if it is determined that the virtual object has the circular area or fan-shaped area configuration attribute, and using the attribute value of the circular area or fan-shaped area configuration attribute as the associated area feature data of the virtual object.

10. The control method according to claim 9, wherein the operation of obtaining associated area feature data of the virtual object further comprises:
    reading the attribute value of the default area configuration attribute of the virtual object if it is determined that the virtual object does not have the circular area or fan-shaped area configuration attribute, and
    using the attribute value of the default area configuration attribute as the associated area feature data of the virtual object.

11. An electronic device, comprising:
    one or more processors;
    a display; and
    memory comprising instructions that, when executed by the one or more processors, cause the processors to perform operations comprising:
    activating a virtual object in a virtual scene on the display;
    obtaining a current location and area feature data of the virtual object in the virtual scene on the display;
    determining an associated area of the virtual object according to the area feature data;
    determining whether the current location of the virtual object is located outside the associated area of the virtual object, wherein the virtual object is configured to return to a pre-specified location within the associated area when the virtual object is outside the associated area;

in accordance with a determination that the current location of the virtual object is outside the associated area of the virtual object, determining a current state of the virtual object at the current location;

in accordance with a determination that the virtual object is performing an action of a first state:
controlling the virtual object to return to the pre-specified location within the associated area in the virtual scene after waiting for the virtual object to complete the action of the first state; and in accordance with a determination that the virtual object is in a second state:
controlling the virtual object to return to the pre-specified location within the associated area after waiting for a predetermine time period.

12. The electronic device of claim 11, wherein the virtual object performs the action of the first state in response to a user instruction of another virtual object to interact with the virtual object in the virtual scene.

13. The electronic device of claim 11, wherein the operations further comprise:
forgoing any change to the state of the first virtual object while the virtual object is returning to the pre-specified location; and
in accordance with detecting that the first virtual object has returned to the pre-specified location, resetting one or more parameters associated with the virtual object to original values respectively.

14. The electronic device of claim 11, wherein the associated area comprises a closed area of the virtual object on a map, and wherein the closed area comprises a customized area or a default area, wherein the customized area is a polygon area, a circular area, or a fan-shaped area.

15. A non-transitory computer-readable storage medium storing instructions, the instructions, when executed by one or more processors of an electronic device having a display, cause the processors to perform operations comprising:
activating a virtual object in a virtual scene on the display;
obtaining a current location and area feature data of the virtual object in the virtual scene on the display;
determining an associated area of the virtual object according to the area feature data;
determining whether the current location of the virtual object is located outside the associated area of the virtual object, wherein the virtual object is configured to return to a pre-specified location within the associated area when the virtual object is outside the associated area;

in accordance with a determination that the current location of the virtual object is outside the associated area of the virtual object, determining a current state of the virtual object at the current location;

in accordance with a determination that the virtual object is performing an action of a first state:
controlling the virtual object to return to the pre-specified location within the associated area in the virtual scene after waiting for the virtual object to complete the action of the first state; and in accordance with a determination that the virtual object is in a second state:
controlling the virtual object to return to the pre-specified location within the associated area after waiting for a predetermine time period.

16. The non-transitory computer-readable storage medium of claim 15, wherein the virtual object performs the action of the first state in response to a user instruction of another virtual object to interact with the virtual object in the virtual scene.

17. The non-transitory computer-readable storage medium of claim 15, wherein the operations further comprise:
forgoing any change to the state of the first virtual object while the virtual object is returning to the pre-specified location; and
in accordance with detecting that the first virtual object has returned to the pre-specified location, resetting one or more parameters associated with the virtual object to original values respectively.

* * * * *